Patented June 23, 1942

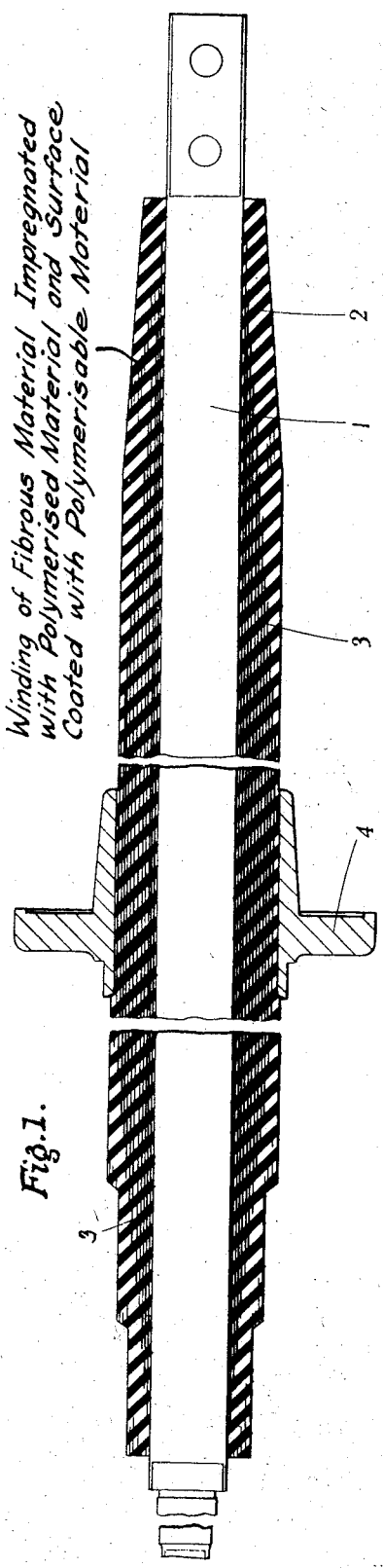
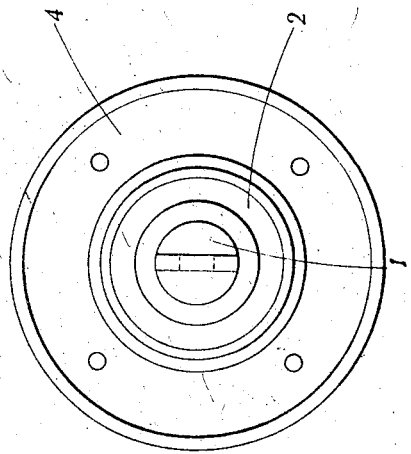

2,287,201

UNITED STATES PATENT OFFICE 2,287,201

ELECTRICAL STRESS GRADING DEVICE

Thomas Robertson Scott and John Krauss Webb, London, England, assignors to International Standard Electric Corporation, New York, N. Y.

Application October 15, 1938, Serial No. 235,183
In Great Britain November 24, 1937

7 Claims. (Cl. 174—143)

This invention relates to electrical stress grading devices such as condenser cones or condenser bushings. Stress grading devices in accordance with the invention may be employed with advantage in connection with power cables, overhead lines, transformers, switchgear and other electrical apparatus, for example in a stress cone at the termination of a power cable, in a condenser cone for power line carrier potential dividers, in high voltage condensers, bushings for use in connection with transformers or in connection with switchgear.

From time to time various suggestions have been put forward with the object of improving the insulation of stress grading devices, for example, in U. S. application Ser. No. 35,960, filed August 13, 1935, which became Patent No. 2,209,894, issued July 30, 1940, there is described a method of providing a cable termination with a stress cone impregnated with polymeric material. However, this prior method involved the application of heat for a sufficiently long period, almost always over two days, to convert monomer within the cable insulation and within the stress grading device into polymer. We have now found that this somewhat prolonged heat treatment such as is necessary to effect polymerisation is rather undesirable, one difficulty apart from the time involved being that voids may be produced and we have therefore carried out experiments with a view to providing a stress grading device, with what may be called polymerised insulation, without the necessity for taking special steps to effect the polymerisation of considerable quantities of monomer within the device.

According to the present invention there is provided a method of preparing a stress grading device comprising building up the insulation of the device by winding sheets or tapes of fibrous insulating material impregnated with polymerised material into conical, cylindrical or other desired form, inserting conducting layers between the convolutions of the insulating material during the building up operation and rendering the surface polymer of the fibrous material tacky and adhesive by applying polymerisable material thereto in order to convert the built-up device into a solid unit.

The polymerisable material may be applied to the insulation by basting the fibrous material with polymerisable material at intervals during the building up of the insulation or by immersing the device in polymerisable material after building up of the insulation or by forcing polymerisable material in between the convolutions of the insulation after building up thereof.

It may here be explained that the process of polymerisation is generally considered to consist of building up the concentration of polymer dissolved or suspended in the monomer until substantially 100% of polymer is obtained. The film of polymerisable material basted on the fibrous material or otherwise applied thereto may therefore be looked upon as dissolving or possibly chemically swelling the polymer contained in the adjacent sheets or tapes of fibrous material, or at all events the polymer on the surface thereof, so that the whole structure of the device comprises fibrous material and polymeric material slightly diluted with polymerisable material, i. e. almost completely polymerised. In this way the polymer is rendered tacky and adhesive with the result that the adjacent tapes adhere to one another, and to the conducting layers after which the device rapidly turns solid. The polymerisable material applied to the impregnated insulation may be in monomeric form or may be partially polymerised, but since the viscosity may be raised considerably by a small degree of polymerisation it is not desirable to carry this process too far. It will be understood that by the above method the necessity for a prolonged heat treatment (i. e. two or more days) is avoided but if desired a short period of heating (i. e. up to 10 hours) may be employed to assist in obtaining uniformity.

The fibrous material may be impregnated with any suitable polymerised material and it may be mentioned that the tapes may be totally impregnated or may only be lacquered or surface impregnated to a sufficient extent for the polymer to bind into the surface of the fibrous material in which case an equally satisfactory surface layer of polymer is obtained. If the tapes are merely lacquered with polymer it may be desirable for the tapes to be pre-impregnated with a hydrocarbon such as a resin and resin oil composition prior to the lacquering. Fibrous material impregnated according to U. S. Patent No. 2,147,824 issued February 21, 1939, may be employed.

The polymerisable material applied to the impregnated tapes may be the same as the polymer impregnating the tapes or may be different therefrom and further two or more polymerisable materials may be blended together if desired. Furthermore, suitable plasticisers may be incorporated in the polymerisable material. Among the polymerisable materials that may be employed for application to the impregnated tapes aromatic mono-olefines and particularly monomeric styrene may be mentioned as the most satisfactory, or styrene blended with other monomers for example para-divinyl benzene and/or mixed with suitable plasticisers (e. g. 10% to 15% of abalyn or an aromatic such as methyl, ethyl or propyl, naphthalene or phenanthrene, fluorene or diphenyl). The above polymerisable materials are also very suitable for the original impregnation of the tapes prior to application to the stress grading device.

At this point it may be mentioned that the polymerisable material employed for application to the tapes should be liquid or at all events plastic at normal atmospheric conditions and should when polymerised have sufficiently low dielectric loss properties. The dielectric loss that can be tolerated will obviously depend upon the conditions under which the device is to be operated. In addition the polymerisable material should obviously be capable of rendering tacky the surface layer of the polymer forming the impregnant of the fibrous tapes (inasmuch as most monomers have this effect on their polymers it may in many cases be advisable to employ as the polymerisable material the monomer of the polymer which forms the impregnant of the tapes).

It has been mentioned above that one application of a stress grading device according to the invention is in connection with power cables. In the preparation of a power cable joint, paper or fabric tapes impregnated with polymer may be lapped on to the cable core and a film of monomer basted over each lapping. During the building up operation metal layers in the form of tin foil may be inserted to form a complete convolution at appropriate diameters. In this and similar cases the stress grading device according to the invention forms an integral part of the cable. The invention may, however, clearly be applied in connection with stress grading devices which are not particularly designed for application to power cables; for example high voltage condensers, and bushings for transformers or switchgear. In Fig. 5 of U. S. Patent No. 1,935,820, there is disclosed a method of building up stress grading cones, the method described may be modified in accordance with the present invention by employing paper tapes impregnated with polymerised material which are wound around formers and basted with monomer as described or which are wound on dry and thereafter have polymerisable material applied thereto.

In order that the invention may be more clearly understood reference is directed to the accompanying drawing which shows by way of example a condenser bushing according to the invention.

A condenser bushing such as that shown may for example be employed at a position at which a conducting lead from a power transformer has to be extended through a wall. In the drawing, reference 1 indicates the conductor for connection at each end to the conducting lead, 2 is the fibrous insulation impregnated with polymerised material, 3 indicates the conducting layers, the inner layer adjacent the conductor 1 being at high potential and the outer layer being at low potential and 4 is a bracket by means of which the bushing may be secured to a wall. In preparing the stress grading device the fibrous impregnated insulation 2 may be lapped on to the conductor 1 and basted at intervals with monomer. Conducting layers 3 may be inserted at appropriate diameters as shown and the bracket 4 is placed in position and maintained in set position by a convenient method (i. e. by employing a split bracket and clamping it around the insulation).

Finally it may be mentioned that the conducting layers may be in the form of metal foil, metallised papers or the like or metal may be sprayed on to the impregnated insulation during the building up operation.

What is claimed is:

1. A method of preparing a stress grading device comprising building up alternate layers of insulation and conductive material around a central member by alternately winding sheets or tapes of fibrous material impregnated with polymerized material around said member and forming a layer of conductive material on said sheets or tape, said impregnated sheets or tapes being in a non-adhesive state before winding, and rendering the surface polymer of the impregnating material tacky and adhesive by applying polymerizable material thereto, and maintaining said polymerizable material at a polymerizing temperature until polymerization occurs whereby said device forms a substantially solid unit.

2. A method of preparing a stress grading device comprising building up alternate layers of insulation and conductive material around a central member by alternately winding sheets or tapes of fibrous material impregnated with polymerized material around said member and forming a layer of conductive material on said sheets or tapes and rendering the surface polymer of the impregnating material tacky and adhesive by basting the sheets or tapes with polymerizable material at intervals during the winding process, and maintaining said polymerizable material at a polymerizing temperature until polymerization occurs whereby said device forms a substantially solid unit.

3. A method of preparing a stress grading device comprising building up alternate layers of insulation and conductive material around a central member by alternately winding sheets or tapes of fibrous material impregnated with polymeric material comprising polystyrene around said member and forming a layer of conductive material on said sheets or tapes, said impregnated sheets or tapes being in a non-adhesive state before winding, and rendering the surface polymer of the impregnating material tacky and adhesive by applying polymerizable material thereto, and maintaining said polymerizable material at a polymerizing temperature until polymerization occurs whereby said device forms a substantially solid unit.

4. A method of preparing stress grading device comprising building up alternate layers of insulation and conductive material around a central member by alternately winding sheets or tapes of fibrous material impregnated with polymerized material around said member and forming layers of conductive material on said sheets or tapes, the layers of conductive material being successively shorter in length as each layer is applied, said impregnated sheets or tapes being in a non-adhesive state before winding, and rendering the surface polymer of the impregnating material tacky and adhesive by applying polymerizable material thereto, and maintaining said polymerizable material at a polymerizing temperature until polymerization occurs whereby said device forms a substantially solid unit.

5. A method according to claim 1, characterized in this, that after building up of the insulation, the device is immersed in the polymerisable material which thereby is caused to seep into the insulation to render the surface polymer thereof tacky.

6. A method according to claim 1, characterised in this, that the polymerisable material is forced between the convolutions after building up the insulation in order to render the surface polymer thereof tacky.

7. A method according to claim 1, characterised in this, that the conducting layers are inserted by spraying metal on to the fibrous impregnated insulation.

THOMAS ROBERTSON SCOTT.
JOHN KRAUSS WEBB.